United States Patent [19]

Evans

[11] Patent Number: 5,534,038
[45] Date of Patent: Jul. 9, 1996

[54] TINTING HYDROGEL MATERIALS WITH VAT DYES

[75] Inventor: John M. Evans, Fremont, Calif.

[73] Assignee: Pilkington Barnes Hind, Inc., Sunnyvale, Calif.

[21] Appl. No.: 446,559

[22] Filed: May 19, 1995

Related U.S. Application Data

[63] Continuation of Ser. No. 258,566, Jun. 10, 1994, abandoned.

[51] Int. Cl.$^6$ .................. D06P 3/36; D06P 5/00; C09B 9/00
[52] U.S. Cl. .............. 8/507; 8/509; 8/651; 8/552; 8/541; 8/582; 8/611; 524/745; 264/1.1
[58] Field of Search ................ 264/1.1; 8/507, 8/509, 552, 650–653, 541, 582, 611; 524/745

[56] References Cited

U.S. PATENT DOCUMENTS

| | | | |
|---|---|---|---|
| 4,093,361 | 6/1978 | Erickson et al. | 351/160 |
| 4,157,892 | 6/1979 | Tanaka et al. | |
| 4,640,805 | 2/1987 | Neefe | 264/1.1 |
| 4,719,657 | 1/1988 | Bawa | 8/453 |
| 4,851,471 | 7/1989 | Maltman et al. | 524/719 |
| 4,891,046 | 1/1990 | Wittmann et al. | |
| 4,997,897 | 3/1991 | Melpolder | |
| 5,034,166 | 7/1991 | Rawlings et al. | |
| 5,151,106 | 9/1992 | Bhaumik et al. | 8/507 |
| 5,292,350 | 3/1994 | Molock | |
| 5,292,610 | 3/1994 | Helling et al. | |

FOREIGN PATENT DOCUMENTS

| | | |
|---|---|---|
| 1233302 | 3/1988 | Canada . |
| 0122771 | 10/1984 | European Pat. Off. . |
| 0480049 | 4/1992 | European Pat. Off. . |
| 0396376 | 11/1992 | European Pat. Off. . |
| 0549808 | 7/1993 | European Pat. Off. . |
| 62-265357 | 11/1987 | Japan . |
| 01299560 | 12/1989 | Japan . |
| 1400892 | 7/1975 | United Kingdom . |
| 1583492 | 1/1981 | United Kingdom . |
| 2105061 | 3/1983 | United Kingdom . |
| 92-11407 | 7/1992 | WIPO . |

OTHER PUBLICATIONS

Trotman, E. R., "Dyeing and Chemical Technology of Textile Fibers", Vat Dyes, Fifth Edition, 498–526. no month available 1975.

McGraw-Hill, Encyclopedia of Science & Technology, 6th Edition, 442–446. no month available 1987.

Chapter XIV, Leucoesters of Vat Dyestuffs, pp. 257–261 no month available 1987.

Primary Examiner—Margaret Einsmann
Attorney, Agent, or Firm—Burns, Doane, Swecker & Mathis

[57] ABSTRACT

Disclosed are processes for tinting hydrogel materials, such as contact lenses, by dissolving a leuco sulfate ester of a vat dye in an compatible monomer solution, adding an oxidizing initiator to the monomer solution, and oxidizing and polymerizing the monomer solution and dye in the same solution. In one aspect, the oxidation and polymerization are conducted simultaneously whereas in another embodiment, the oxidation of the soluble leuco sulfate ester of a vat dye to the insoluble vat dye and polymerization are conducted sequentially in the same reaction medium.

15 Claims, No Drawings

TINTING HYDROGEL MATERIALS WITH VAT DYES

This application is a continuation of application Ser. No. 08/258,566, filed Jun. 10, 1994 now abandoned.

BACKGROUND OF THE INVENTION

1. Field of the Invention

This invention relates to the manufacture of tinted hydrogel materials. More specifically, this invention relates to the manufacture of tinted hydrogel materials, such as contact lenses, wherein the tint is achieved by use of vat dyes.

2. State of the Art

For many years, soft hydrophilic contact lenses have been produced as clear, colorless products. Although clear contact lenses ensure that the lenses are hardly noticeable on a patient's eye, these lenses are difficult to locate when lost or dropped on a randomly colored surface. In order to alleviate this problem, a tint is conventionally added to the lens. This tint may be throughout the whole of the lens, over the whole of an area banded by the iris diameter, leaving the perimeter clear, or even only that area in a doughnut shape which would be superadjacent to the iris. The tint may be deep in color and some lenses have been developed to enhance the color of the iris. Other tints are sufficiently light so as not be noticeable on the eye or interfere with color perception, yet be intense enough to allow the lens to be easily located. This latter type of tint has often been described as a handling tint, "locator" tint or "visibility" tint.

The application of a handling tint has usually been made to a lens after the lens has been fully manufactured to its final hydrated form. Such methods are described in U.S. Pat. Nos. 4,891,046 and 4,157,892. U.S. Pat. No. 4,891,046 describes tinting a hydrophilic contact lens with a dichlorotriazine dye in a two step procedure. In the first step of the procedure, the lens, which is formed from a hydrophilic polymer obtained by the peroxide-initiated polymerization of a polymer forming composition, is immersed in an aqueous solution of dichlorotriazine dye. Under specific conditions, the dye diffuses into the lens. Thereafter, the dye-impregnated lens is immersed in an aqueous solution of base which catalyzes the reaction of the dye with the hydroxyl groups on the polymer backbone which results in covalent incorporation of the dye onto/into the polymer backbone. Accordingly, such processes involve covalent incorporation of the dye to the polymer backbone in a procedure separate from the preparation of the lens (polymer) itself which disadvantageously extends the manufacturing process and increases costs.

Covalent incorporation of such reactive dyes at a monomeric stage has also been disclosed in the art. For example, U.S. Pat. No. 4,997,897 describes a method of incorporating monomerically reactive dyes at the monomer stage so that the dye becomes part of the lens polymer matrix. The monomeric reactive dyes described in this reference require a multi-step synthesis so as to incorporate the reactive vinyl functionality onto the dye molecule. In this way the dye becomes covalently integrated into the polymer during polymerization. However, such multi-step syntheses to form monomers useful in hydrogel formation disadvantageously extend the manufacturing process to include synthetic steps to the dye prior to polymerization.

Similarly, U.S. Pat. Nos. 5,151,106 and 5,292,350 describe methods for tinting a hydrophilic polymer by incorporating a reactive dye into monomers used during polymerization. The reactive dye is physically entrained within the polymer composition and, subsequently, the polymer composition is contacted with an aqueous solution of a base which catalyzes the covalent attachment of the reactive dye to the polymer. For example, the —OH group of the hydroxyethyl methacrylate polymer, under alkaline conditions, will form an ether bond with the reactive dye. This method requires the reactive dyes to be soluble in the monomer mix and requires exposure to a "fixative" environment during or after the lens hydration. According to U.S. Pat. No. 5,151,106, oxidizing initiators cannot be used for conducting the polymerization of the lens polymer in this method because many of the reactive dyes are sensitive to discoloration by oxidation. A further disadvantage to this method is that extra steps are required in the manufacturing process to rinse and reequilibrate the lens for storage in physiological saline.

Accordingly, a common aspect associated with covalent attachment of a dye to the polymer backbone either during or after polymerization is that such attachment requires additional process steps so as either to covalently attach the dye to the formed polymer or to modify the dye to include a reactive vinyl functionality which will permit incorporation of the dye into the polymer during polymerization. However, such additional process steps do not lend themselves to an efficient overall tinting process.

In contrast to the above, the art also discloses processes for non-covalent incorporation of insoluble vat dyes into hydrogel materials. For example, European Patent No. 0 122 771 B discloses a process wherein the hydrogel material is simultaneously contacted with a swelling agent having a swelling power greater than water and a soluble leuco sulfate ester precursor of the insoluble vat dye in order to permit incorporation of the soluble leuco sulfate ester into the hydrogel material. Subsequently the hydrogel material is treated with an oxidizing agent to convert the soluble leuco sulfate ester to an insoluble vat dye wherein substantially all of the vat dye is physically locked within the hydrogel material. As is apparent this tinting process involves several separate process steps after formation of the hydrogel material.

Other methods for the non-covalent incorporation of a colorant into a hydrogel material includes a first step of incorporating a colorant onto the interior mould surface followed by addition of monomer to the mold and subsequently polymerizing the monomer as described by Rawlings, U.S. Pat. No. 5,034,166. However, this process requires exact placement of the colorant onto the interior mold surface which enhances the difficulty of the process.

Other methods for non-covalent incorporation of tint to hydrogel materials involve including a monomer soluble dye that is water insoluble so as to become trapped in the hydrated hydrogel material. However, such hydrogel materials can be subject to undesirable leaching of the monomer soluble dye which would result in color fading as well as could pose toxicity concerns in patients where the monomer soluble dye could leach during use of a hydrogel material such as use as ophthalmic devices.

Still other known methods for non-covalent incorporation of tint to hydrogel materials (e.g., contact lenses) involve the use of fine dispersions/suspensions of monomer insoluble dyes into the prepolymer mix. Upon polymerization, the insoluble dye is dispersed throughout the hydrogel material. However, one problem associated with this approach is that the monomer insoluble dyes are subject to undesirable aggregate and agglomerate formation.

Accordingly, prior art processes for the non-covalent incorporation of dyes and other colorants into a hydrogel material do not lend themselves to an efficient overall tinting process.

In view of the above, there is a need in the art for a simple method of manufacturing hydrogel materials (e.g., contact lenses) with a tint which does not require extra steps or extra chemicals other than the tinting chemical.

SUMMARY OF THE INVENTION

This invention is directed, in part, to a method for the manufacture of tinted hydrogel materials using a vat dye wherein the tinting and polymerization process take place in a single reaction medium thereby simplifying the overall tinting process.

Specifically, in one of its method aspects, this invention is directed to a method for the manufacture of tinted hydrogel materials which method comprises:

(a) dissolving a leuco sulfate ester of an insoluble vat dye in a compatible hydrophilic ethylenically unsaturated monomer or mixture of monomers to form a monomer solution;

(b) adding an oxidizing initiator to the monomer solution produced in (a) above;

(c) oxidizing the leuco sulfate ester of the vat dye in the monomer solution to an insoluble vat dye; and (d) polymerizing the monomer composition produced in (c) above by exposing the monomer composition to polymerization conditions.

In one embodiment, the oxidation of the leuco sulfate ester of the vat dye in the monomer solution to the insoluble vat dye is initiated simultaneously with initiation of the polymerization of the monomer composition. Surprisingly, in this aspect, because the polymerization and oxidizing step are initiated simultaneously, the tinting process is simply incorporated into the polymerization process without the need for additional process steps either prior to or after polymerization.

In another embodiment, the oxidation of the leuco sulfate ester of the vat dye in the monomer solution to the insoluble vat dye and the polymerization of the monomer composition are conducted sequentially. In this embodiment, the manufacturing process is simplified because oxidation and polymerization are conducted in the same reaction medium.

This invention is also directed to novel compositions for use in the methods described above. In particular, in one of its composition aspects, this invention is directed to a composition comprising a compatible hydrophilic ethylenically unsaturated monomer or mixture of monomers and from about 0.05 to about 0.5 weight percent of a leuco sulfate ester of a vat dye.

DETAILED DESCRIPTION OF THE PREFERRED EMBODIMENTS

The novel processes of this invention involve manufacturing tinted contact lenses by dissolving a leuco sulfate ester of a vat dye in a hydrophilic ethylenically unsaturated monomer or mixture of monomers used to prepare the hydrophilic lenses, adding an oxidizing initiator to the monomer, and oxidizing and polymerizing the monomer and dye. In these processes, the oxidation of the leuco sulfate ester of the vat dye to the insoluble vat dye and polymerization of the compatible monomer solution can take place either simultaneously or sequentially.

When conducted simultaneously, a particularly preferred aspect of this process is the use of an oxidizing initiator which can operate both to oxidize the leuco sulfate ester of the vat dye and to polymerize the monomer solution. Surprisingly, with this method no extra steps or chemicals other than the vat dye are needed to tint the lenses. Only those chemicals and steps ordinarily used to manufacture of hydrogel materials tinted with a vat dye are needed.

In another embodiment, the oxidation can be allowed to take place prior to or after subjecting the monomer solution to polymerizing conditions resulting in sequential oxidation and polymerization. While sequential oxidation and polymerization processes are less preferred than simultaneous oxidation and polymerization processes, it does have the advantage that the reactions are simply conducted sequentially in a single reaction medium.

However, prior to discussing this invention in further detail, the following terms will be defined.

Definitions

As used herein, the following terms have the definitions given below:

The term "vat dyes" or "water-insoluble vat dyes" refers to well known classes of dyes which are distinguished by the special method of application needed, a vatting operation. Vat dyes can be readily reduced to a water-soluble leuco form. Subsequent oxidation then produces the insoluble colored form of the dye.

The term "leuco sulfate esters of vat dyes" refer to the well known water soluble salts of vat dyes. Upon hydrolysis and oxidation, the leuco sulfate ester of the vat dye is converted to the water insoluble form of the vat dye. A large variety of useful water soluble leuco sulfate esters have been devised and synthesized over the years. Many of these esters are commercially available and in sufficient colors so that mixtures of such esters are adequate to produce any desired range of hues. The particular leuco sulfate ester employed in this invention and the corresponding subsequent vat dye is not critical and includes, by way of example only, the following leuco sulfate esters of:

dibromodibenzo(b,def)chrysene-7,14-dione 16,23,-dihydrodinaphtho(2,3-a:2',3'-i)naphth(2',3':6,7)-indolo( 2,3-c)carbazole-5,10,15,17,22,24-hexone N,N'-(9,10-dihydro-9,10-dioxo-1,5-anthracenediyl)bis-benzamide 6,6'-diethoxy-Δ-2,2'-(3H,3'H)bibenzo(b)thiophene-3,3'-dione 7,16-dichloro-6,15-dihydro-5,9,14,18-anthrazinetetrone 16,17-dimethoxydinaphtho(1,2,3-cd:3',2',1'-1m)perylene-5,10-dione It is generally accepted that the molecular structure of these solubilized leuco sulfate esters of vat dyes are exemplified by the diagrammatic formulas of the type shown below for solubilized Δ-2,2'(3H, 3'H)bisindole-3,3'-dione:

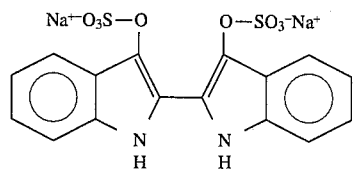

and solubilized 6,15-dihydro-5,9,14,18-anthrazine-tetrone:

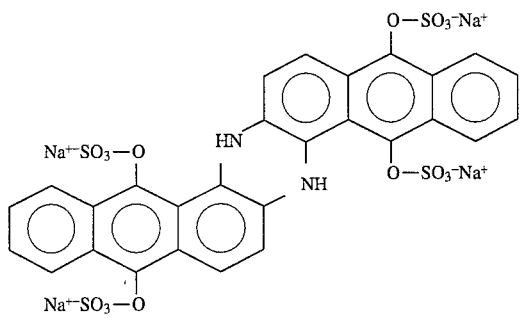

and that the multiplicity of very hydrophilic sodium sulfate groups is responsible for the solubility of these materials in aqueous media.

Solubilized leuco sulfate esters of vat dyes are sensitive to moisture, which will hydrolyze them. Once hydrolyzed, they are prone to air-oxidation, a process potentiated by light, especially that of shorter wavelengths. For these reasons, it is prudent to store the leuco esters in a suitable environment such as in a vacuum desiccator in the absence of light.

Referring to the two leuco sulfate esters of vat dyes whose structural formula were depicted above, the hydrolyzed and oxidized form of Δ-2,2'(3H,3'H)bisindole-3,3'-dione has the structural formula:

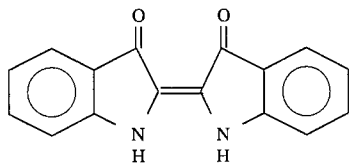

and the hydrolyzed and oxidized form of 6,15-dihydro-5,9,14,18-anthrazine-tetrone has the structural formula:

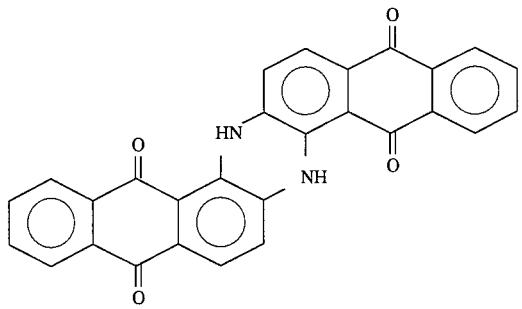

The term "compatible hydrophilic ethylenically unsaturated monomer" refers to hydrophilic ethylenically unsaturated monomers capable of solubilizing at least 0.05 weight percent of at least one leuco sulfate ester of a vat dye which monomers contain at least one hydrophilic functionality (e.g., a hydroxyl group, a carboxyl group, an amide group, etc.) which, when said monomers are incorporated in sufficient amounts into a polymer, renders the resulting polymer capable of absorbing at least 5 weight percent water.

Preferably, the resulting polymers will be able to absorb between 10 and 95 weight percent water and more preferably between 20 and 70 weight percent water.

In another preferred embodiment, the compatible hydrophilic ethylenically unsaturated monomer will solubilize up to at least 0.5 weight percent of at least one leuco sulfate ester of a vat dye.

Suitable compatible hydrophilic ethylenically unsaturated monomers for use herein are readily determined merely by ascertaining the solubility of a selected leuco sulfate ester of a vat dye in the monomer and determining the amount of water absorbed by a polymer of that monomer. Such determinations are well within the skill of the art. The particular compatible hydrophilic ethylenically unsaturated monomer for use in this invention is not critical and monomers suitable for use herein include, by way of example only, hydroxy lower alkyl acrylates or methacrylates, hydroxy lower alkoxy lower alkyl acrylates or methacrylates, and alkoxy lower alkyl acrylates or methacrylates. A "lower alkyl" or "lower alkoxy" is herein defined to mean an alkyl or alkoxy having from 1 to 6 carbon atoms. Specific hydrophilic monomers include hydroxyethyl methacrylate (HEMA), hydroxyethylacrylate, hydroxypropyl methacrylate, hydroxypropyl acrylate, butanediol monomethacrylate monoacrylate, glyceryl acrylate, glyceryl methacrylate, vinylpyrrolidone, N,N-dimethylacrylamide, and the like. The hydroxyalkyl acrylates and methacrylate, particularly 2-hydroxyethyl methacrylate are generally preferred.

The term "ethylenically unsaturated monomers free of hydrophilic functionality" refers to comonomers conventionally employed in combination with a compatible ethylenically unsaturated hydrophilic monomer in the preparation of hydrogel copolymers suitable for use in contact lenses which monomers are free of hydrophilic functionality. Such monomers include styrene, acrylates or methacrylates such as methyl methacrylate, ethyl acrylate, isopropyl acrylate, propyl acrylate, butyl acrylate, sec-butyl acrylate, pentyl acrylate, 2-ethylhexyl acrylate, methyl methacrylate, ethyl methacrylate, propyl methacrylate, isopropyl methacrylate, butyl methacrylate, sec-butyl methacrylate, pentyl methacrylate, cyclohexyl methacrylate and fluorinated acrylates and methacrylates such as trifluoromethyl methacrylate, trifluoromethyl acrylate, 2',2',2'-trifluoroethyl methacrylate, 2',2',2'-trifluoroethyl acrylate, 1,1,1,3,3,3-hexafluoroisopropyl methacrylate, etc., aryl acrylates and methacrylates such as phenyl acrylate, phenyl methacrylate, etc. Other suitable monomers include allyl or aryl vinyl ethers such as ethyl vinyl ether, phenyl vinyl ether, and the like.

The term "cross-linking agent" refers to a monomer containing at least two reactive groups capable of forming covalent linkages with reactive groups found on at least one of the monomers used to prepare the polymer compositions described herein. Suitable reactive groups include, for example, vinyl groups which can participate in the polymerization reaction. The reactive groups are typically substituents on a suitable backbone such as a polyoxyalkylene backbone (including halogenated derivatives thereof), a polyalkylene backbone, a glycol backbone, a glycerol backbone, a polyester backbone, a polyamide backbone, polyurea backbone, a polycarbonate backbone, and the like.

Cross-linking agents for use in the preferred compositions described herein are well known in the art and the particular cross-linking agent employed is not critical. Preferably, however, the reactive vinyl group is attached to the backbone of the cross-linking agent via an ester bond such as that found in acrylate and methacrylate derivatives such as urethane diacrylate, urethane dimethacrylate, ethylene glycol diacrylate, ethylene glycol dimethacrylate, polyoxyethylene diacrylate, polyoxyethylene dimethacrylate, and the like. However, other suitable vinyl compounds include, by way of example, di- and higher- vinyl carbonates, di- and higher-vinyl amides (e.g., $CH_2=CH-C(O)NHCH_2CH_2NH-C(O)CH=CH_2$), divinyl benzene and the like.

Preferred cross-linking agents include, by way of example, ethylene glycol dimethacrylate, ethylene glycol diacrylate, diethylene glycol dimethacrylate, diethylene glycol diacrylate, triethylene glycol dimethacrylate, triethylene glycol diacrylate, tetradecaethylene glycol dimethacrylate, tetradecaethylene glycol diacrylate, allyl methacrylate, allyl acrylate, trimethylol-propane trimethacrylate, trimethylolpropane triacrylate, 1,3-butanediol dimethacrylate, 1,3-butanediol diacrylate, 1,4-butanediol dimethacrylate, 1,4-butanediol diacrylate, 1,6-hexanediol dimethacrylate, 1,6-hexanediol diacrylate, 1,9-nonanediol dimethacrylate, 1,9-nonanediol diacrylate, 1,10-decanediol dimethacrylate, 1,10-decanediol diacrylate, neopentyl glycol dimethacrylate, neopentyl glycol diacrylate, 2,2'bis[p-(γ-methacryloxy-β-hydroxypropoxy)phenyl] propane, pentaerythritol triacrylate, pentaerythritol trimethacrylate, pentaerythritol tetraacrylate, pentaerythritol tetramethacrylate, 1,4-cyclohexanediol diacrylate, 1,4-cyclohexanediol dimethacrylate, ethoxylated bis-phenol-A-diacrylate, ethoxylated bis-phenol-A-dimethacrylate, bis-phenol-A-dimethacrylate, bis-phenol-A-diacrylate, N,N'-methylenebisacrylamide, and the like. Such materials are well known in the art and are either commercially available or can be prepared by methods known per se in the art.

The cross-linking agent preferably has at least 2 and more preferably from 2 to about 6 vinyl functionalities and preferably has a number average molecular weight of from about 100 to about 2,500. More preferably, the vinyl functionalities are acrylate or methacrylate groups attached to a polyoxyalkylene backbone (including halogenated derivatives thereof), a polyalkylene backbone, a glycol backbone, a glycerol backbone, a polyester backbone, or a polycarbonate backbone.

The term "compatible non-volatile hydrophilic solvent" refers to solvents which have a boiling point of greater than about 70° C. and which are non-reactive either with the reagents employed to prepare the tinted hydrogel material or with the tinted hydrogel material itself. Suitable such solvents include, by way of example, water, methanol, ethanol, ethylene glycol, glycerol, N-methyl pyrrolidone, methylene chloride, boric acid esters of polyhydric alcohols and dihydric alcohols and the like. Suitable polyhydric alcohols and dihydric alcohols are disclosed in U.S. Pat. Nos. 4,495,313 and 5,039,459 both of which are incorporated herein by reference in their entirety.

Methodology

The methods used to prepare the tinted hydrogel materials involve first combining the requisite amounts of reagents in a common reaction vessel. Typically, the desired amount of a compatible hydrophilic ethylenically unsaturated monomer or mixture of such monomers is first combined with the leuco sulfate ester of a vat dye together with any optional reagents such as a cross-linking agent as well as any ethylenically unsaturated monomer(s) free of hydrophilic functionality. Surprisingly, it has been found that under these conditions, the selected leuco sulfate ester of the vat dye is soluble in the monomer composition and, accordingly, there is no need to add water to the composition to effect solubility of this ester.

In general, the amount of hydrophilic ethylenically unsaturated monomer relative to the total amount of monomer employed can range from about 1 to 100 weight percent with the balance being ethylenically unsaturated monomer(s) free of hydrophilic functionality. The specific amounts of each monomer selected are dependent upon the desired properties for the resulting polymer composition including an ability of the polymer composition to absorb at least about 10 weight percent water which, in turn, depends upon the relative hydrophilicity of the hydrophilic ethylenically unsaturated monomer as well as the relative hydrophilicity of any other comonomers and the relative amounts of each in the resulting polymer. Such factors are readily ascertainable by the skilled artisan. Due to this ability to absorb water, the resulting polymer composition is often referred to as a "hydrogel" or "hydrogel material".

While hydrogels derived from a single monomer can be used, copolymeric, terpolymeric, etc. hydrogels are typically employed because the use of more than one monomer provides a ready vehicle to tailor a broad range of properties in the final product for its intended use. Examples of copolymeric or higher hydrogels include the polymer compositions set forth in Table I below:

TABLE I

| Monomer A | Monomer B | Monomer C | Monomer D |
| --- | --- | --- | --- |
| MMA | DMA | EGDMA | — |
| MMA | DMA | EGDMA | — |
| HEMA | NVP | MAA | — |
| MMA | NVP | AMA | — |
| MMA | GMA | EGDMA | — |
| HEMA | DMA | MMA | TMPTMA |
| HEMA | DMA | MMA | TMPTMA |
| HEMA | EGDMA | — | — |
| HEMA | MMA | NVP | DVB |

AMA = allyl methacrylate
DMA = dimethylacrylamide
DVB = divinyl benzene
EGDMA = ethylene glycol dimethylacrylate
GMA = glyceryl methacrylate
HEMA = hydroxyethyl methacrylate
MMA = methylmethacrylate
NVP = N-vinylpyrrolidone
TMPTMA = trimethylolpropane trimethacrylate Commercially available copolymers, terpolymers, etc. suitable for use herein include tetrafilcon A, polymacon, bufilcon A 45, crofilcon A, surfilcon A, perfilcon A, Netrafilcon A, and the like.

In general sufficient amounts of the selected leuco sulfate ester of a vat dye or mixtures thereof are added to the monomer composition to achieve the desired hue and depth of hue after oxidation and polymerization in the hydrogel material. Preferably, the selected leuco sulfate ester of a vat dye or mixtures thereof are employed at from about 0.05 to about 0.5 weight percent relative to the total amount of monomer employed including any ethylenically unsaturated monomer(s) free of hydrophilic functionality used in the composition.

The hydrogel materials prepared by the methods of this invention are preferably cross-linked and, accordingly, one of the components of a preferred monomer/leuco sulfate ester of a vat dye is a cross-linking agent. When employed, the cross-linking agent is employed in an amount sufficient to provide a cross-linked product but preferably is employed in an amount of from about 0.1 to about 5 weight percent and more preferably from about 0.1 to about 0.5 weight percent based on the total weight of the monomer(s) and leuco sulfate ester(s) employed.

After all of the desired components are combined, the composition is then converted to the tinted hydrogel material in one of two methods as set forth below.

Simultaneous Oxidation and Polymerization

In the first method, oxidation of leuco sulfate ester of a vat dye to the water insoluble vat dye and polymerization of the monomers to form a tinted polymeric composition for subsequent hydration to a hydrogel material are initiated simultaneously. Such simultaneous oxidation and polymerization is achieved by using a bifunctional reagent which effects both oxidation and polymerization. Such bifunctional reagents include thermal polymerization initiators such as peroxides which are well known for their use in polymerizing vinyl containing monomers but, due to the presence of an oxidizing group, also effect oxidation of the leuco sulfate ester to the insoluble vat dye. Due to the presence of such oxidizing groups, such thermal initiators are sometimes referred to herein as "oxidizing initiators".

Other oxidizing initiators suitable for use in the methods described herein include, by way of example, non-chemical initiators such as ultraviolet (UV) light which can initiate photoxidation of the leuco sulfate ester of the vat dye to the insoluble vat dye and simultaneously initiate polymerization. Similarly, the use of high temperatures in an oxygen atmosphere can initiate oxidation.

Examples of specific oxidizing initiators include, for instance, chemical oxidizing initiators such as t-butyl peroxy pivalate (TBPP), t-butyl peroxy neodecanoate (TBPN), benzoyl peroxide, methyl ethyl ketone peroxide, diisopropyl peroxycarbonate, acetyl peroxide, stearoyl peroxide and the like. The particular oxidizing initiator employed is not critical.

In general, when a chemical oxidizing initiator is employed, it is employed in sufficient amounts to both initiate oxidation of the leuco sulfate ester of the selected vat dye(s) as well as to initiate polymerization of the monomer composition. Preferably, however, the chemical oxidizing initiator is employed at from about 0.01 to about 1 weight percent relative to the total amount of monomer(s) (including any cross-linking agents) and leuco sulfate ester(s) in the composition.

The oxidation and polymerization reactions are typically conducted at from about 20° C. to about 100° C. and are generally complete within from about 1 to 120 minutes. However, as is apparent, it is unlikely that polymerization and oxidation will proceed at the same rate and under these circumstances, it may be necessary to extend the reaction so as to further complete oxidation or polymerization.

Sequential Oxidation and Polymerization

In an alternative embodiment, oxidation of the leuco sulfate ester of the vat dye to the water insoluble vat dye and polymerization of the monomer composition can be initiated sequentially. In one preferred embodiment, oxidation of the leuco sulfate ester of the vat dye is initiated prior to initiation of polymerization of the monomer composition by use of an initiator more selective for oxidation than polymerization under the conditions employed. Such selective oxidation initiators are known in the art and include, by way of example, low quanta of UV light, oxidants having low polymerization capacity, and the like.

In this embodiment, after oxidation has been initiated, polymerization of the monomer composition is then initiated by adding a polymerization initiator to the reaction medium and/or subjecting the reaction medium to polymerization conditions. Such polymerization initiators are well known in the art and include thermal initiators, UV initiators, as well as γ irradiation, or electron beam irradiation.

Thermal polymerization initiators are typically added to the mixture of monomers under an inert atmosphere (e.g., argon) and maintaining the mixture at an elevated temperature of from about 20° C. to about 75° C. for a period of time from about 1 to about 48 hours. Suitable thermal initiators are described above and are employed in the amounts also described above.

Ultraviolet (UV) induced polymerization can be achieved by combining a suitable UV initiator into the monomer composition under an inert atmosphere (e.g., argon) and maintaining the mixture under a suitable UV source. Preferably, UV induced polymerization is conducted at ambient conditions for a period of from about 5 minutes to about 24 hours. Suitable UV initiators are well known in the art and include, by way of example, benzoin methyl ether, bisazoisobutyronitrile and the like. The particular UV initiator employed is not critical and sufficient initiator is employed to catalyze the polymerization reaction. Preferably, the initiator is employed at up to about 1 weight percent based on the total weight of the composition.

Polymerization achieved by either electron beams or γ irradiation does not require the use of an initiator and the formulation to be polymerized is merely exposed to sufficient quantities of electron beam or γ irradiation under polymerization conditions using conventional methods.

Alternatively, polymerization of the monomer mix can precede oxidation of the leuco sulfate ester of the selected vat dye merely by employing a polymerization reagent which polymerizes the monomer composition prior to oxidizing the leuco sulfate ester. Upon polymerization, the sulfate ester is dispersed/solubilized throughout the polymer composition and is subsequently oxidized by conventional methods, e.g., exposure to light, hydration of the xerogel with an oxidizing solution such as an aqueous sodium nitrite solution, and the like.

Whether oxidation and polymerization are initiated simultaneously or sequentially, these reactions are preferably conducted in a manner so as to facilitate manufacture of the finished contact lens. For example, polymerization can be conducted in molds which correspond to the structure of the contact lens. Alternatively, polymerization can be conducted so as to form a polymer rod which can be machined (lathed) to provide contact lenses of suitable dimensions. In this latter embodiment, polymerization is conducted in a glass test tube and after polymerization, the test tube is broken to provide for the polymeric rod. The rod, in the form of the xerogel, can be machined, for example, lathed, cut, milled, and consequently, the rod can be made into contact lens by cutting small cylinders or buttons from the rod and subsequent lathing.

Post-Treatment Steps

After polymerization and oxidation, whether conducted simultaneously or sequentially, subsequent completion of the oxidation can be accomplished in a separate post-polymerization step. In one preferred embodiment, completion of the oxidation is accomplished by heating the polymer composition in an autoclave at a temperature of from about 105° C. to about 130° C. for from about 10 minutes to about 1 hour. The completion of the oxidation process finalizes the color or hue of the composition.

Likewise, a post-polymerization curing procedure is also optionally employed to complete the polymerization process which typically increases the hardness of the polymer. The post-curing procedure can comprise heating the polymer to a temperature of from about 60° C. to 130° C. for a period of from about 2 to about 24 hours.

The resulting polymer material typically does not contain more than trace amounts of water and is referred to in the art as a xerogel composition. This composition is then hydrated via conventional techniques to incorporate at least 10 weight percent water into the polymer material thereby converting the polymer from a xerogel composition to a hydrogel composition.

Alternatively, the requisite amount of water or other compatible non-volatile hydrophilic solvent required for hydrogel formation can be incorporated directly into the monomer/leuco sulfate ester mixture prior to oxidation and polymerization. In this embodiment, the water or other compatible non-volatile hydrophilic solvent can assist in solubilizing the leuco sulfate ester and, when employed, are preferably employed up to about 75 weight percent based on the total weight of the resulting polymer composition. In the case of water, it is contemplated that subsequent oxidation and polymerization will result directly in hydrogel formation without the need for a separate hydration step.

The methods of this invention provide for an efficient manufacturing process as it relates to conventional methods for tinting hydrogel materials with a vat dye such as wherein the insoluble vat dye is first generated from a water soluble leuco sulfate ester thereof by oxidation and precipitation from the aqueous solution followed by washing and drying the precipitate and then dispersed in a monomer solution used to prepare a desired tinted hydrogel product.

Utility

The hydrophilic polymers described herein are particularly useful in the manufacture of hydrogel materials which are conventionally employed in ophthalmic devices such as contact lenses and intraocular lenses. Preferably, these hydrophilic polymers are used in the methods of this invention to manufacture contact lenses. Additionally, the hydrophilic polymers, prior to hydration, are useful for the absorption of water in such products as disposable diapers, etc.

The invention will now be illustrated in greater detail by the following specific examples. It is understood that these examples are given by way of illustration and are not meant to limit the disclosure or the claims to follow. All percentages in the examples, and elsewhere in the specification, are by weight unless otherwise specified.

EXAMPLES

In the examples set forth below, the water content of polymer compositions are provided. Unless otherwise indicated, these water content values were determined as follows:

Measurement Of Equilibrium Water Content

Equilibrium Water Content (EWC) is determined by soaking the polymer samples in phosphate buffered saline solution for overnight. The samples are removed, lightly blotted dry with a tissue and subsequently weighed. The hydrated samples are then placed in a vacuum oven at 60° C. overnight. The next day, the sample is reweighed. Equilibrium Water Content is calculated using the following equation:

$$EWC = \frac{X - Y}{X} \times 100\%$$

where

X=mass of hydrated polymer

Y=mass of dehydrated polymer

The EWC is sometimes referred to herein as % water.

In the examples below, Examples 1, 2 and 6 illustrate simultaneous oxidation of the leuco sulfate ester to the insoluble vat dye and polymerization of the monomer composition followed by hydration of the resulting polymer composition. Example 3 illustrates the sequential initiation of oxidation of the leuco sulfate ester followed by initiation of polymerization of the monomer composition and then hydration of the resulting polymer composition. Example 4 illustrates the sequential initiation of polymerization of the monomer composition followed by initiation of the oxidation of the leuco sulfate ester followed by hydration of the resulting polymer composition and hydration of the resulting polymer. Example 5 illustrates the simultaneous oxidation of the leuco sulfate ester of the vat dye and polymerization of the monomer composition in the presence of water directly resulting in the hydrogel material.

Example 1

A solution of 0.1 weight percent of the leuco sulfate ester of Vat Green #1 dye was made up in hydroxyethyl methacrylate containing 0.5 weight percent ethylene glycol dimethacrylate as a cross-linking agent. A brownish fluorescent green solution formed. To this solution was added 0.9 weight percent azobis isobutyronitrile and the solution was then poured into lens molds and polymerized/oxidized by thermal treatment at 60° C. for five hours. The resulting polymer composition was then treated by a post-cure step which comprised heating the composition at 90° C. for two hours.

The polymeric material was then released from the molds and hydrated in buffered saline to provide a tinted hydrogel material in the form of contact lenses having a slight aqua green coloration which coloration is resistant to autoclaving and which material contains about 38 weight percent water.

Example 2

A solution of 0.1 weight percent of the leuco sulfate ester of Vat Blue #6 dye was made up in hydroxyethyl methacrylate containing 0.5 weight percent ethylene glycol dimethacrylate as a cross-linking agent. An orange solution was formed. To this solution was added 0.9 weight percent azobis isobutyronitrile and the solution was then poured into lens molds and polymerized/oxidized by thermal treatment at 60° C. for five hours. The resulting polymer composition was then treated by a post-cure step which comprised heating the composition at 90° C. for two hours.

The polymeric material was then released from the molds and hydrated in buffered saline to provide a tinted hydrogel material in the form of contact lenses having a blue coloration which coloration is resistant to autoclaving and which material contains about 38 weight percent water.

Example 3

A solution of 0.1 weight percent of the leuco sulfate ester of Vat Blue #6 dye was made up in hydroxyethyl methacrylate containing 0.5 weight percent ethylene glycol dimethacrylate as a cross-linking agent. An orange solution formed. To this solution was added 0.3 weight percent tert-butyl peroxy neodecanoate. Before dispensing, the monomer solution was maintained at room temperature for 30 minutes whereupon the solution turned to a blue coloration evidencing that at least a portion of the leuco sulfate ester was oxidized to the insoluble vat dye. The solution was then poured into lens molds and polymerized by thermal treatment at 60° C. for five hours. The resulting polymer composition was then treated by a post-cure step which comprised heating the composition at 90° C. for two hours.

The polymeric material was then released from the molds and hydrated in buffered saline to provide a tinted hydrogel material in the form of contact lenses having blue coloration which coloration is resistant to autoclaving and which material contains about 38 weight percent water.

Example 4

A solution of 0.1 weight percent of the leuco sulfate ester of Vat Orange #5 dye was made up in hydroxyethyl methacrylate containing 0.5 weight percent ethylene glycol dimethacrylate as a cross-linking agent. To this solution was added 0.9 weight percent azobis isobutyronitrile and the solution was then poured into lens molds and polymerized/ oxidized by thermal treatment at 60° C. for five hours. The resulting polymer composition was then treated by a post-cure step which comprised heating the composition at 90° C. for two hours.

The polymeric material was then released from the molds and hydrated in buffered saline to provide a clear hydrogel material in the form of contact lenses which material contains about 38 weight percent water. Upon contact with an aqueous solution of sodium nitrite, the hydrogel material became a bright orange color which coloration was resistant to autoclaving.

While the oxidation step of this example was conducted after removal of the hydrogel material from the molds, such could have been readily conducted as part of the hydration step thereby incorporating this step into the overall process conventional employed to prepared hydrogel materials.

Example 5

The procedure of Example 1 is repeated except that the composition comprising the monomer, the cross-linking agent and the leuco sulfate ester of Vat Green No. 1 dye further comprises about 38 weight percent water. Upon simultaneous oxidation and polymerization, the resulting polymer is a tinted hydrogel material without the need to employ a separate hydration step.

The above examples demonstrate the methods of this invention. It is understood that additional polymer compositions could be readily tinted by the methods illustrated above. For example, the polymer compositions described in Table I above could be tinted by these methods merely by substitution of the appropriate polymer composition for the compositions described in the Examples. Likewise, other vat dyes could be incorporated into the tinted hydrogel materials merely by substitution of a suitable leuco sulfate ester of a selected vat dye for the leuco sulfate ester of the vat dye exemplified in the examples.

Example 6

A solution of 0.2 weight percent of the leuco sulfate ester of C.I. Vat Blue #6 dye dissolved in a mixture comprising 74 parts N-vinyl pyrrolidone, 25 parts methyl methacrylate and 0.2 parts allyl methacrylate was prepared. A yellow/orange solution formed. To this solution was added 0.6 parts of azobis isobutyronitrile as the initiator, and the solution was dispensed into molds made to form contact lenses. The filled molds were cured by heating at 60° C. for five hours followed by post-curing at 90° C. for two hours.

At the completion of the polymerization, the lenses were released from the lens mold to give blue colored dry lenses. The lenses were then extracted and hydrated to provide for tinted hydrogel contact lenses having 74 weight percent water which lenses were stored in a buffered saline solution. The blue coloration of the lenses was resistant to autoclaving.

In another embodiment the dye could be dissolved in the more hydrophilic monomer, N-vinyl pyrrolidine, and the remaining monomers and the initiator added and mixed prior to dispensing into contact lens molds.

In addition the monomer mix could contain from 0 to 2.0% of a conventional functionally UV absorbing monomer, and cured at temperatures ranging from 35° C. to 70° C.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method for the manufacture of tinted hydrogel materials which method comprises:
   (a) dissolving a leuco sulfate ester of a vat dye in a composition comprising a compatible hydrophilic ethylenically unsaturated monomer or mixture of monomers to form a monomer solution;
   (b) adding an oxidizing initiator to the monomer solution produced in (a) above;
   (c) oxidizing said leuco sulfate ester of the vat dye in the monomer solution to an insoluble vat dye; and
   (d) polymerizing the monomer composition produced in (c) above by exposing the monomer composition to polymerization conditions.

2. The method of claim 1, wherein the oxidation procedure (c) and polymerization procedure (d) are initiated simultaneously.

3. The method of claim 1, wherein the oxidation procedure (c) and polymerization procedure (d) are initiated sequentially.

4. The method of claim 3, wherein initiation of said oxidation procedure (c) precedes initiation of said polymerization procedure (d).

5. The method of claim 3, wherein initiation of said polymerization procedure (d) precedes initiation of said oxidation procedure (c).

6. The method of claim 1, wherein the composition produced in procedure (a) further comprises at least one ethylenically unsaturated monomer containing no hydrophilic functionality.

7. The method of claim 1, wherein the composition produced in procedure (a) further comprises a compatible, non-volatile hydrophilic solvent.

8. The method of claim 1, wherein the composition produced in procedure (a) is free of added compatible, non-volatile hydrophilic solvent.

9. The method of claim 1, wherein the composition produced in procedure (a) further comprises a cross-linking agent.

10. The method of claim 1, wherein the composition produced in procedure (a) further comprises at least one ethylenically unsaturated monomer containing no hydrophilic functionality and a crosslinking agent.

11. The method of claim 10, wherein said composition further comprises a compatible, non-volatile, hydrophilic solvent.

12. The method of claim 1, wherein the hydrogel material is an ophthalmic device.

13. A method for the manufacture of tinted hydrogel materials which comprises
   (a) dissolving a leuco sulfate ester of a vat dye in a compatible hydrophilic ethylenically unsaturated monomer to form a monomer solution;
   (b) adding an oxidizing initiator to the monomer solution produced in (a) above;
   (c) simultaneously initiating oxidation of the leuco sulfate ester to an insoluble vat dye and polymerization of the monomer composition by exposing the monomer composition to polymerization conditions.

14. A method for the manufacture of tinted hydrogel materials which comprises (a) dissolving a leuco sulfate ester of a vat dye in a compatible hydrophilic ethylenically unsaturated monomer to form a monomer solution;

(b) adding an oxidizing initiator to the monomer solution produced in (a) above;

(c) initiating oxidation of said leuco sulfate ester in the monomer solution to an insoluble vat dye which is dispersed throughout the monomer; and subsequently (d) initiating polymerization of the monomer composition produced in (c) above by exposing the monomer composition to polymerization conditions.

15. A method for the manufacture of tinted hydrogel materials which comprises (a) dissolving a leuco sulfate ester of a vat dye in a compatible hydrophilic ethylenically unsaturated monomer to form a monomer solution;

(b) adding an oxidizing initiator to the monomer solution produced in (a) above;

(c) initiating polymerization of the monomer composition produced in (b) above by exposing the monomer composition to polymerization conditions; and subsequently (d) initiating oxidation of said leuco sulfate ester in the polymer composition produced in (c) above to an insoluble vat dye which is dispersed throughout said polymer composition.

* * * * *